US008673469B2

(12) United States Patent
Chang et al.

(10) Patent No.: US 8,673,469 B2
(45) Date of Patent: Mar. 18, 2014

(54) APPARATUS FOR PROTECTION OF SECONDARY BATTERY (75) Inventors: Sung Kyun Chang, Daejeon (KR); Joon Hwan Lee, Daejeon (KR); Jae Hyun Lee, Daejeon (KR); Soo Hyun Ha, Busan (KR); Jeong Ju Cho, Daejeon (KR); Sang Hoon Choy, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/490,359

(22) Filed: Jul. 20, 2006

(65) Prior Publication Data

US 2007/0072060 A1 Mar. 29, 2007

(30) Foreign Application Priority Data

Jul. 20, 2005 (KR) .................. 10-2005-0065627
Aug. 17, 2005 (KR) .................. 10-2005-0075403

(51) Int. Cl.
*H01M 10/50* (2006.01)
*H01M 10/00* (2006.01)
(52) U.S. Cl.
CPC ........ *H01M 10/00* (2013.01); *H01M 2200/105* (2013.01); *H01M 2200/10* (2013.01)
USPC .............................. 429/62; 429/61
(58) Field of Classification Search
CPC ............... H01M 2200/10; H01M 2200/105
USPC ....................................... 429/61, 62
See application file for complete search history.

(56) References Cited

U.S. PATENT DOCUMENTS 5,252,411 A * 10/1993 Yokokawa et al. ............. 429/62
5,496,654 A * 3/1996 Perkins ............................ 429/1
7,629,073 B2 12/2009 Cho et al.
2002/0004160 A1 * 1/2002 Shimada et al. ................ 429/62
2003/0027036 A1 * 2/2003 Emori et al. .................... 429/61
2006/0011942 A1 * 1/2006 Kim et al. ...................... 257/192

FOREIGN PATENT DOCUMENTS

JP 61082681 4/1986
JP 05121102 5/1993
JP 06295748 10/1994
JP 2004096919 3/2004

OTHER PUBLICATIONS

Science Direct; Thin Solid films, "Physical Properties of Vanadium Pentoxide sol gel films"; vol. 371, Issues 1-2, Aug. 2000, pp. 259-263.
Korean Office Action dated Aug. 30, 2007 for Application No. 10-2006-0067699.
International Search Report dated Oct. 31, 2006 for Application No. PCT/KR2006/002852.

* cited by examiner

*Primary Examiner* — Zachary Best
(74) *Attorney, Agent, or Firm* — Lerner, David, Littenberg, Krumholz & Mentlik, LLP (57) ABSTRACT The present invention is an apparatus for protecting a secondary battery, in which, when the secondary battery such as a lithium-ion secondary battery is exposed to high temperature exceeding a working range due to a change in external environment, external impacts, and so on, or heated due to spontaneous generation of heat caused by internal defects, the secondary battery is discharged. The apparatus includes a thyristor or transistor having an anode and a cathode connected both terminals of the secondary battery respectively, and shorting both terminals of the secondary battery when gate current is supplied, and a temperature sensor detecting temperature of the secondary battery and supplying the gate current to the thyristor or transistor when the detected temperature is higher than predetermined temperature.

8 Claims, 7 Drawing Sheets

APPARATUS FOR PROTECTION OF SECONDARY BATTERY

This application claims the benefit of the filing dates of Korean Patent Application Nos. 2005-65627 and 2005-75403, filed on Jul. 20, 2005 and Aug. 17, 2005, respectively in the Korean Intellectual Property Office, the disclosures of which are incorporated herein in their entirety by reference.

TECHNICAL FIELD

The present invention relates to an apparatus for protecting a secondary battery, and more particularly, to an apparatus for protecting a secondary battery, in which when the secondary battery is exposed to high temperature exceeding a working range due to a change in external environment, external impacts, internal defects, overcharge, and so on, the secondary battery is discharged into a safe state, thereby preventing the secondary battery from swelling, inflammation, or detonation.

BACKGROUND ART

In general, a battery is divided into a chemical battery and a physical battery, wherein the chemical battery is subdivided into a primary battery, a secondary battery, and a fuel cell. The secondary battery includes a nickel-cadmium (Ni—Cd) secondary battery, a nickel-metal hydride (Ni-MH) secondary battery, a Sealed Lead-Acid (SLA) secondary battery, a lithium-ion secondary battery, a lithium-polymer secondary battery, and a reusable alkaline secondary battery.

Above all, the lithium-ion secondary battery is a kind of organic electrolyte battery having stable properties in terms of high energy density, low-temperature property, storability, and so on, and thus is broadly used as a battery for portable computers. Here, the term "energy density" indicates how much energy is charged, and refers to a value dividing energy capacity by volume or weight.

The lithium-ion secondary battery may be exposed to a high-temperature environment beyond a working range, for instance the inside of a vehicle in the summer season, the heated room of a public bathhouse, an electric heating blanket, a microwave oven, etc., due to carelessness of a user. Further, the lithium-ion secondary battery may spontaneously be heated by an internal short, an overcharge, and the like.

In this manner, when being exposed to high temperature beyond a certain temperature or heated by spontaneous generation of heat, the lithium-ion secondary battery may lead to swelling, inflammation, or detonation.

Conventionally, in order to prevent the lithium-ion secondary battery from being damaged due to the generation of heat caused by a simple overcharge, the lithium-ion secondary battery is connected in series to a positive temperature coefficient (PTC) resistor, a resistance of which increases depending on the generation of heat of the lithium-ion secondary battery.

The PTC resistor inhibits current from flowing to the lithium-ion secondary battery when the lithium-ion secondary battery is overheated, thereby preventing the lithium-ion secondary battery from being charged further.

However, the lithium-ion secondary battery may generate heat due to a change in external environment, an internal short, an external impact etc. in addition to the overcharge. Further, the lithium-ion secondary battery can be heated when being exposed to a high-temperature environment. When the lithium-ion secondary battery is exposed to a high-temperature environment or generates heat in a charged state, it suffers from relatively easy generation of gas, which causes a swelling phenomenon, and in the worst case, detonation or inflammation.

Taking into consideration that the lithium-ion secondary battery generates heat due to a change in external environment, an internal short, an external impact, and so on, or is exposed to a high-temperature environment, there is an earnest need for development of technology capable of protecting the lithium-ion secondary battery.

DISCLOSURE OF THE INVENTION

It is an objective of the present invention to provide an apparatus for protecting a secondary battery, capable of discharging the secondary battery when the secondary battery is subjected to generation of heat or exposure to a high-temperature environment.

It is another objective of the present invention to provide an apparatus for protecting a secondary battery, capable of protecting the secondary battery through a simple structure consisting of a negative temperature coefficient (NTC) thermistor or metal insulator transition (MIT) thermistor, and a switching element, when the secondary battery is subjected to generation of heat or exposure to a high-temperature environment.

It is another objective of the present invention to provide an apparatus for protecting a secondary battery, capable of protecting the secondary battery through a simple structure consisting of a negative temperature coefficient (NTC) thermistor or metal insulator transition (MIT) thermistor, and a thyristor, when the secondary battery is subjected to generation of heat or exposure to a high-temperature environment.

According to an aspect of the present invention, there is provided an apparatus for protecting a secondary battery. The apparatus includes a temperature sensor detecting temperature of the secondary battery and generating control current based on the detected temperature, and a switching element connecting both terminals of the secondary battery and forcibly discharging the second battery according to the control current.

Here, the switching element may be connected to the anode and cathode of the secondary battery, and connect the both electrode of the secondary battery when the control current is supplied. The temperature sensor may detect the temperature of the secondary battery, and supply the control current to the switching element when the detected temperature is higher than predetermined temperature.

Further, the temperature sensor may include a negative temperature coefficient (NTC) thermistor or a metal insulator transition (MIT) thermistor.

According to another aspect of the present invention, there is provided an apparatus for protecting a secondary battery. The apparatus include a thyristor having an anode and a cathode connected both terminals of the secondary battery respectively, and shorting both terminals of the secondary battery when gate current is supplied, and a temperature sensor detecting temperature of the secondary battery and supplying the gate current to the thyristor when the detected temperature is higher than predetermined temperature.

Here, the temperature sensor may include an NTC thermistor or an MIT thermistor, and the thyristor may include any one of a silicon controlled rectifier (SCR), an N-type thyristor, a dual gate thyristor, a bidirectional thyristor (TRIAC), and a gate turn off (GTO) thyristor.

According to the present invention, the secondary battery protection apparatus is connected in parallel to the secondary battery. The generation of heat or exposure to a high-temperature environment is detected from the secondary battery, the secondary battery is discharged. Thereby, an electrolytic solution of the secondary battery is stabilized, and thus inflammation or detonation of the secondary battery can be prevented in advance.

BEST MODE FOR CARRYING OUT THE INVENTION

Reference will now be made in detail to the exemplary embodiments of the present invention.

An apparatus for protecting a secondary battery according to a first embodiment of the present invention will be described with reference to FIG. 1.

A lithium-ion secondary battery 100 and a secondary battery protection apparatus 102 are connected in parallel, in which the secondary battery protection apparatus 102 is composed of a negative temperature coefficient (NTC) thermistor 104 and a first transistor 106. The NTC thermistor 104 is connected between a positive electrode (+) of the lithium-ion secondary battery 100 and a base terminal of the first transistor 106, and emitter and collector terminals of the first transistor 106 are connected with opposite electrodes (anode and cathode) of the lithium-ion secondary battery 100, respectively.

The NTC thermistor 104 has high stability, productivity, resistivity, and temperature coefficient, has five to ten times as high temperature coefficient of electric resistance as a metal has, and is easily finished in various shapes. The NTC thermistor 104 is mainly used as a device for temperature detection, temperature compensation, fluid level detection, wind speed detection, vacuum detection, inrush current prevention, delay, etc., and most broadly used as a temperature sensor at present.

Figure 2:
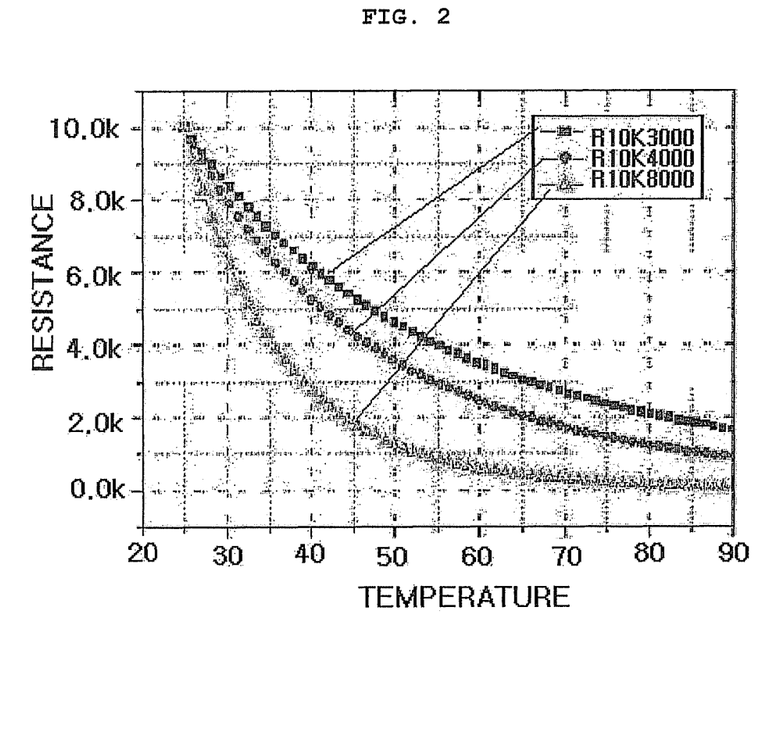
FIG. 2 illustrates negative temperature coefficient (NTC) characteristic curves.

The characteristics of the NTC thermistor 104 will be described in greater detail with reference to FIG. 2. In the NTC thermistor 104, as temperature increases, resistance decreases. A decrement of the resistance is dependent on a resistance coefficient of the NTC thermistors 104. In FIG. 2, three types of NTC thermistors 104, R10K3000, R10K4000 and R10K8000, have different resistance coefficients, so that they have different decrements of the resistance depending on the increase of the temperature. In the present invention, in order to allow the first transistor 106 to be conducted at a predetermined temperature, any one of various NTC thermistors is selected, or a voltage distribution circuit combined with elements such as a resistor may be added.

Figure 1:
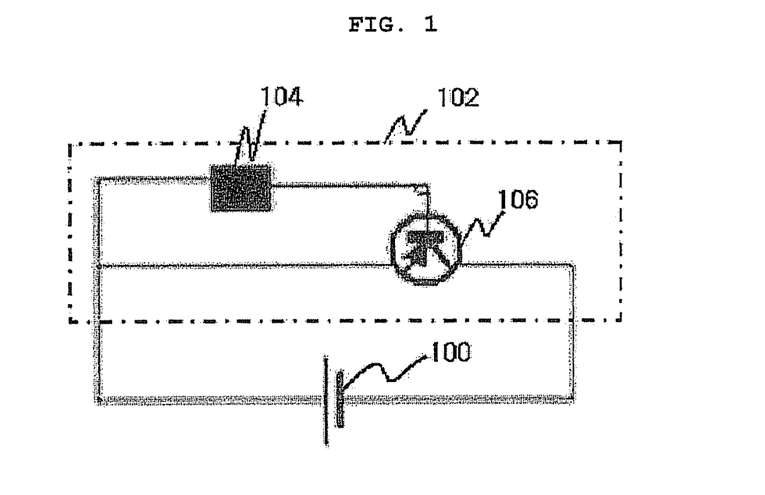
FIG. 1 is a circuit diagram illustrating an apparatus for protecting a secondary battery according to a first exemplary embodiment of the present invention.

In FIG. 1, the first transistor 106 is illustrated to employ a PNP transistor as a switching element, but any switching element shorted or opened according to a predetermined control signal may be employed. In other words, it is apparent to those skilled in the art that the first transistor 106 of FIG. 1 can be replaced by an NPN transistor, in addition to the PNP transistor.

Figure 3:
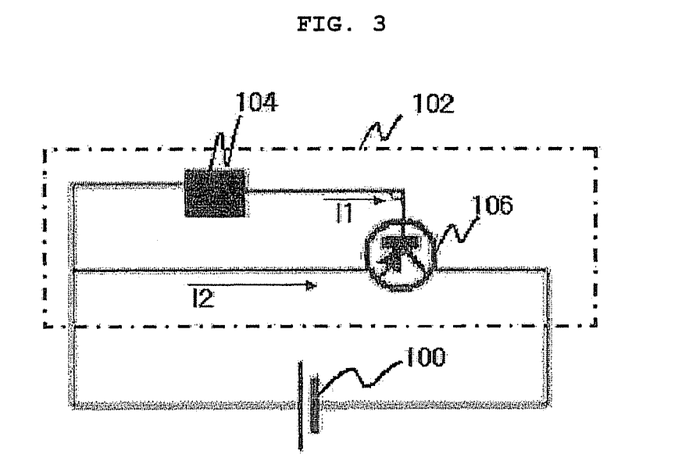
FIG. 3 illustrates a current flow of the secondary battery protection apparatus of FIG. 1.

Now, an operation of the secondary battery protection apparatus according to a first exemplary embodiment of the present invention will be described with reference to FIG. 3.

A state in which the lithium-ion secondary battery 100 is subjected to generation of heat or exposure to a high-temperature environment due to a change in external environment, internal short, external impacts, and so on is sensed by the NTC thermistor 104. In other words, when the lithium-ion secondary battery 100 generates heat at a predetermined temperature and thereby a resistance value of the NTC thermistor 104 is lowered to a predetermined resistance value, the NTC thermistor 104 supplies control current I1 from the lithium-ion secondary battery 100 to a base terminal of the first transistor 106. The first transistor 106 is conducted according to the control current I1 flowing in through the NTC thermistor 104.

When the first transistor 106 is conducted, both terminals of the lithium-ion secondary battery 100 are shorted, and thus current I2 of the lithium-ion secondary battery 100 flows through the first transistor 106. As a result, the lithium-ion secondary battery 100 is forcibly discharged.

As described above, the first exemplary embodiment of the present invention can restrict inflammation or detonation of the lithium-ion secondary battery 100, which is subjected to the generation of heat or the exposure to a high-temperature environment due to internal short, external impacts, and so on, by means of the secondary battery protection apparatus 102 that is simply composed of the NTC thermistor 104 and the first transistor 106.

Now, an apparatus for protecting a secondary battery according to a second exemplary embodiment of the present invention will be described with reference to FIG. 4.

A lithium-ion secondary battery 200 and a secondary battery protection apparatus 202 are connected in parallel, in which the secondary battery protection apparatus 202 is composed of a metal insulator transition (MIT) thermistor 204 and a second transistor 206. The MIT thermistor 204 is connected between a positive electrode (+) of the lithium-ion secondary battery 200 and a base terminal of the second transistor 206, and emitter and collector terminals of the second transistor 206 are connected with both electrodes (anode and cathode) of the lithium-ion secondary battery 200, respectively.

Figure 5:
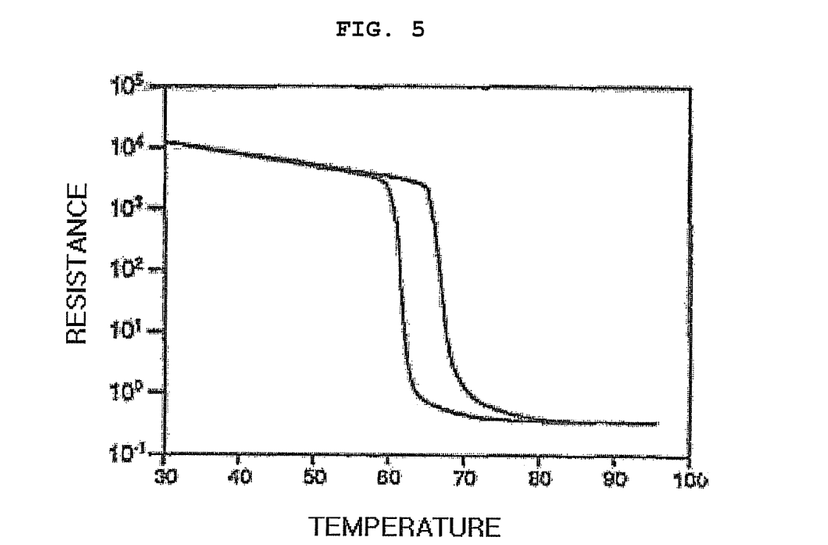
FIG. 5 illustrates metal insulator transition (MIT) characteristic curves.

The characteristics of the MIT thermistor 204 will be described in greater detail with reference to FIG. 5. In the MIT thermistor 204, resistance sharply decreases at a predetermined temperature. A point where the resistance sharply decreases is dependent on a resistance coefficient of the MIT thermistor 204. In other words, because the resistance coefficient of the MIT thermistor 204 is varied according to its type, the temperature where the resistance sharply decreases is different. In the present invention, in order to allow the second transistor 206 to be conducted at a predetermined temperature, any one of various MIT thermistors is selected.

Figure 4:
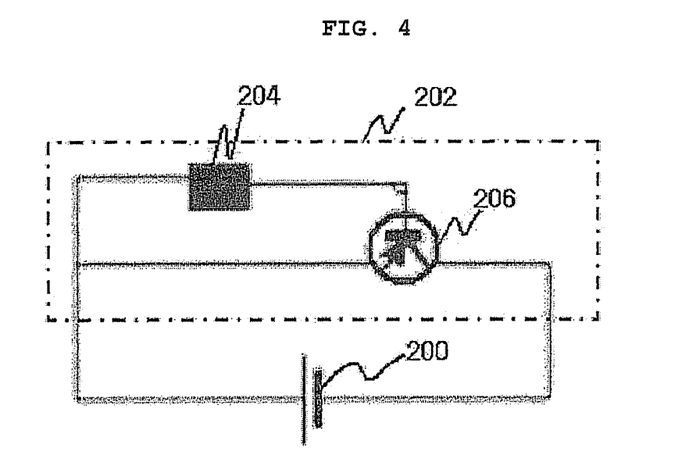
FIG. 4 is a circuit diagram illustrating an apparatus for protecting a secondary battery according to a second exemplary embodiment of the present invention.

In FIG. 4, the second transistor 206 is illustrated to employ a PNP transistor as a switching element, but any switching element shorted or opened according to a predetermined control signal may be employed. In other words, it is apparent to those skilled in the art that the second transistor 206 of FIG. 4 can be replaced by an NPN transistor, in addition to the PNP transistor.

Figure 6:
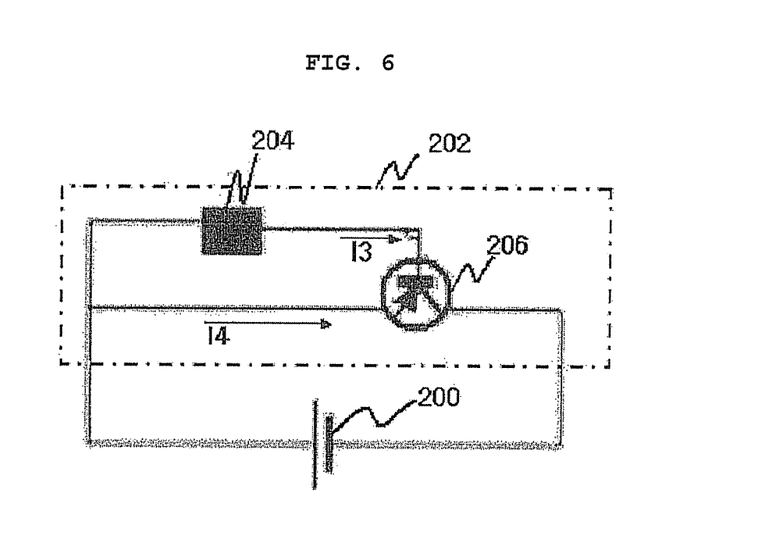
FIG. 6 illustrates a current flow of the secondary battery protection apparatus of FIG. 4.

Now, an operation of the secondary battery protection apparatus according to a second exemplary embodiment of the present invention will be described with reference to FIG. 6.

A state in which the lithium-ion secondary battery 200 is subjected to generation of heat or exposure to a high-temperature environment due to internal short, external impacts, and so on is sensed by the MIT thermistor 204. In other words, when the lithium-ion secondary battery 200 generates heat at a predetermined temperature and thereby a resistance value of the MIT thermistor 204 is lowered to a predetermined resistance value, the MIT thermistor 204 supplies control current I3 from the lithium-ion secondary battery 200 to a base terminal of the second transistor 206. The second transistor 206 is conducted according to the control current I3 flowing in through the MIT thermistor 204.

When the second transistor 206 is conducted, the cathode and anode of the lithium-ion secondary battery 200 are shorted, and thus current I4 of the lithium-ion secondary battery 200 flows through the second transistor 206. As a result, the lithium-ion secondary battery 200 is forcibly discharged.

As described above, the second exemplary embodiment of the present invention can restrict inflammation or detonation of the lithium-ion secondary battery 200, which is subjected to the generation of heat or the exposure to a high-temperature environment due to internal short, external impacts, and so on, by means of the secondary battery protection apparatus 202 that is simply composed of the MIT thermistor 204 and the second transistor 206.

An apparatus for protecting a secondary battery according to a third embodiment of the present invention will be described with reference to FIG. 7.

A lithium-ion secondary battery 300 and a secondary battery protection apparatus 302 are connected in parallel, in which the secondary battery protection apparatus 302 is composed of an NTC thermistor 304 and a first thyrister 306. The NTC thermistor 304 is connected between an positive electrode (+) of the lithium-ion secondary battery 300 and a gate terminal of the first thyrister 306, and cathode and anode terminals of the first thyrister 306 are connected with anode and cathode of the lithium-ion secondary battery 300, respectively.

The NTC thermistor 304 has high stability, productivity, resistivity, and temperature coefficient, has five to ten times as high temperature coefficient of electric resistance as a metal has, and is easily finished in various shapes. The NTC thermistor 304 is mainly used as a device for temperature detection, temperature compensation, fluid level detection, wind speed detection, vacuum detection, inrush current prevention, delay, etc., and most broadly used as a temperature sensor at present.

The characteristics of the NTC thermistor 304 will be described in greater detail with reference to FIG. 2. In the NTC thermistor 304, as temperature increases, resistance decreases. A decrement of the resistance is dependent on a resistance coefficient of the NTC thermistor 304. In FIG. 2, three types of NTC thermistors 304, R10K3000, R10K4000 and R10K8000, have different resistance coefficients, so that they have different decrements of the resistance depending on the increase of the temperature. In the present invention, in order to allow the first thyrister 306 to be conducted at a predetermined temperature, any one of various NTC thermistors is selected, or a voltage distribution circuit combined with elements such as a resistor may be added.

The first thyrister 306 is called a silicon controlled rectifier (SCR), and has three terminals: anode, cathode, and gate. When a gate signal is applied, current flows between the anode and the cathode. In contrast, when a gate signal is not applied, no current flows between the anode and the cathode, and thus high voltage is maintained. The first thyrister 306 has a four-layer structure consisting of P, N, P and N layers, and is capable of withstanding voltage of 6000 V or more, and controlling current of 3000 A or more.

Figure 8:
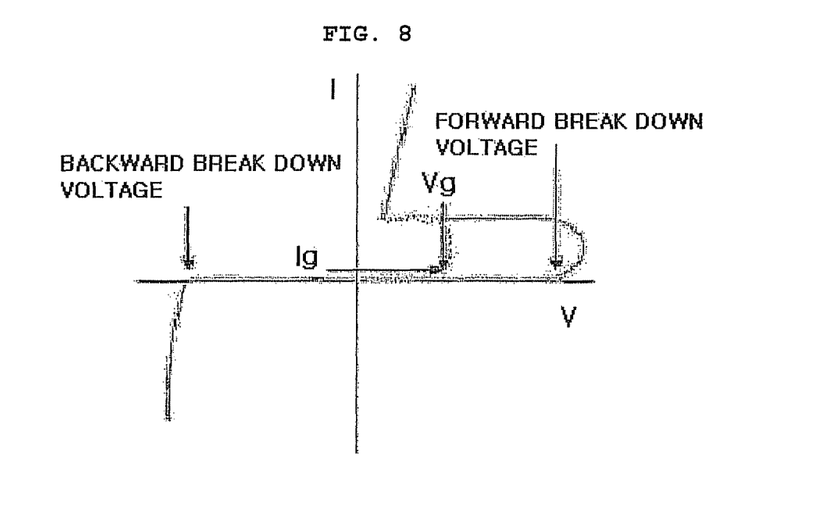
FIG. 8 illustrates characteristic curves of a first thyristor.

Here, referring to FIG. 8 in which the characteristics of the first thyrister 306 are shown, when a predetermined gate current Ig is applied to the first thyrister 306, the first thyrister 306 is conducted, and thus current Ia flows between the anode and the cathode.

Figure 7:
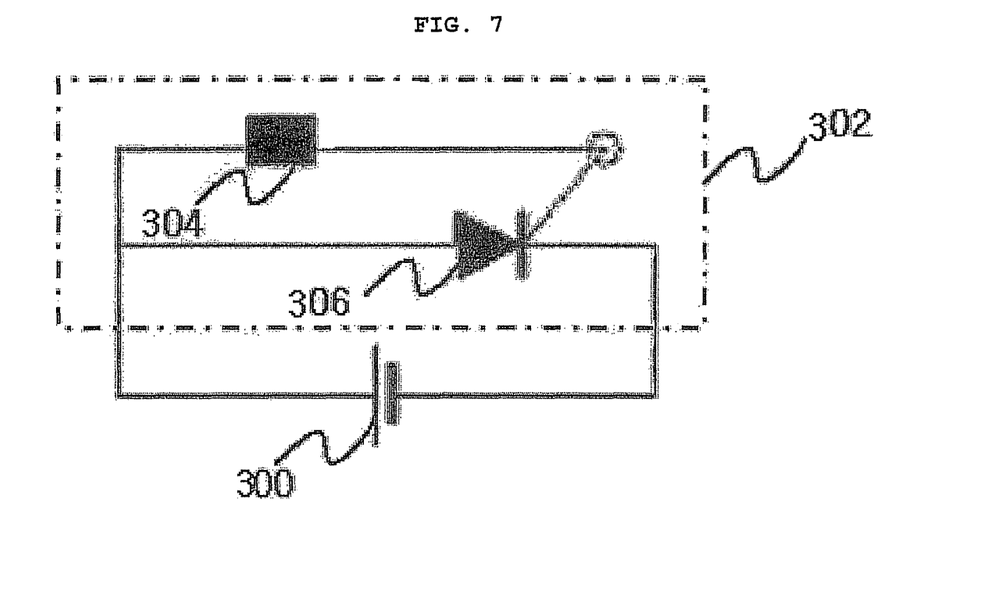
FIG. 7 is a circuit diagram illustrating an apparatus for protecting a secondary battery according to a third exemplary embodiment of the present invention.

Although the first thyristor 306 is illustrated to be employed as a switching element in FIG. 7, any switching element shorted or opened according to a predetermined control signal may be employed. For example, an N-type thyristor, a dual gate thyristor, a bidirectional thyristor (TRIAC), a gate turn off (GTO) thyristor, etc. may be employed as the switching element, which is apparent to those skilled in the art.

Figure 9:
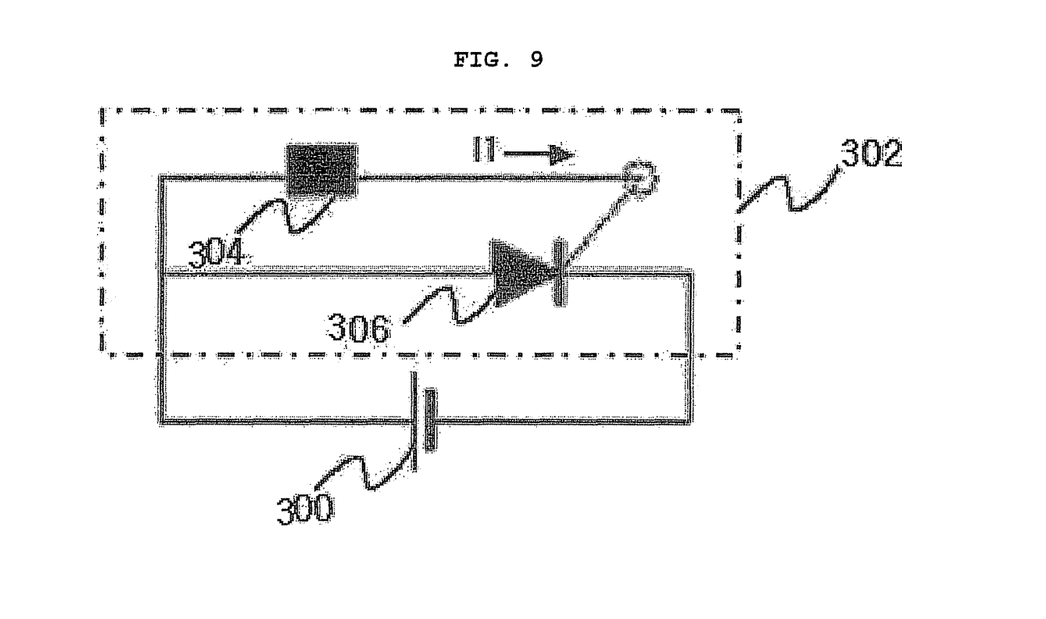
FIGS. 9 and 10 illustrate a current flow of the secondary battery protection apparatus of FIG. 7.
Figure 10:
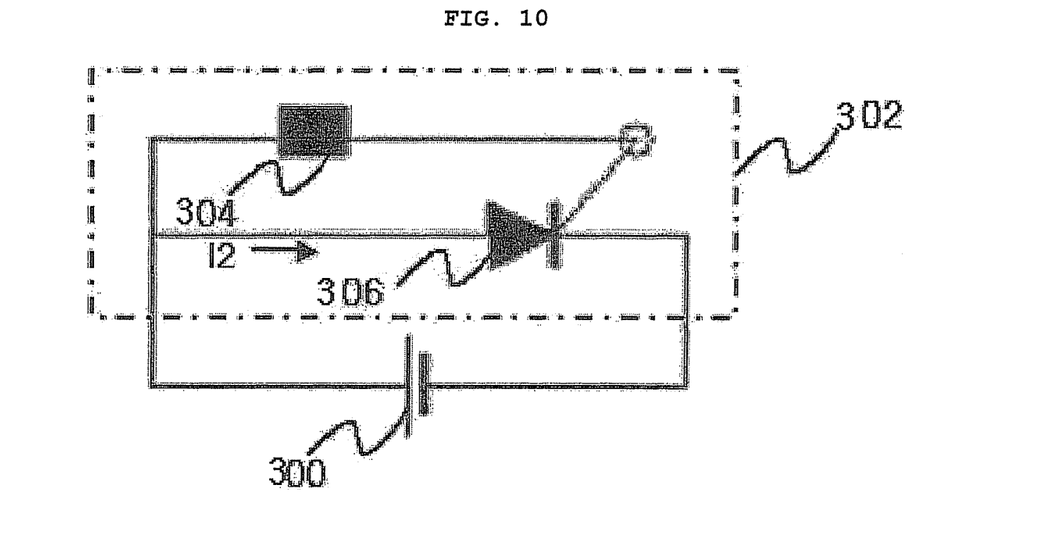

Now, an operation of the secondary battery protection apparatus 302 according to a third exemplary embodiment of the present invention will be described with reference to FIGS. 9 and 10.

A state in which the lithium-ion secondary battery 300 is subjected to generation of heat or exposure to a high-temperature environment due to a change in external environment, internal short, external impacts, and so on is sensed by the NTC thermistor 304. In other words, when the lithium-ion secondary battery 300 generates heat at a predetermined temperature and thereby a resistance value of the NTC thermistor 304 is lowered to a predetermined resistance value, the NTC thermistor 304 supplies control current I1 from the lithium-ion secondary battery 300 to a gate terminal of the first thyristor 306. The first thyrister 306 is conducted according to the control current I1 flowing in through the NTC thermistor 304.

When the first thyristor 306 is conducted, both terminals of the lithium-ion secondary battery 300 are shorted, and thus current I2 of the lithium-ion secondary battery 300 flows through the first thyrister 306. As a result, the lithium-ion secondary battery 300 is forcibly discharged.

As described above, the third exemplary embodiment of the present invention can restrict inflammation or detonation of the lithium-ion secondary battery 300, which is subjected to the generation of heat or the exposure to a high-temperature environment due to internal short, external impacts, and so on, by means of the secondary battery protection apparatus 302 that is simply composed of the NTC thermistor 304 and the first thyrister 306.

Now, an apparatus for protecting a secondary battery according to a fourth exemplary embodiment of the present invention will be described with reference to FIG. 11.

A lithium-ion secondary battery 400 and a secondary battery protection apparatus 402 are connected in parallel, in which the secondary battery protection apparatus 402 is composed of an MIT thermistor 404 and a second thyristor 406.

The MIT thermistor 404 is connected between a positive electrode(+) of the lithium-ion secondary battery 400 and a gate terminal of the second thyristor 406, and anode and cathode terminals of the second thyristor 406 are connected with cathode and anode of the lithium-ion secondary battery 400, respectively.

The characteristics of the MIT thermistor 404 will be described in greater detail with reference to FIG. 5. In the MIT thermistor 404, resistance sharply decreases at a predetermined temperature. A point where the resistance sharply decreases is dependent on a resistance coefficient of the MIT thermistor 404. In other words, because the resistance coefficient of the MIT thermistor 404 is varied according to its type, the temperature where the resistance sharply decreases is different. In the present invention, in order to allow the second thyristor 406 to be conducted at a predetermined temperature, any one of various MIT thermistors is selected.

Figure 11:
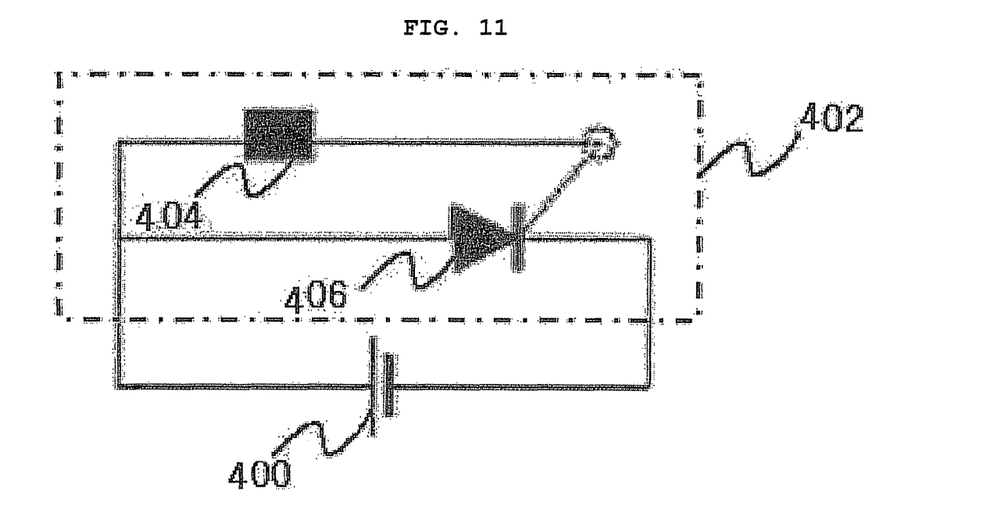
FIG. 11 is a circuit diagram illustrating an apparatus for protecting a secondary battery according to a fourth exemplary embodiment of the present invention.

In FIG. 11, the second thyristor 406 is illustrated to be employed as a switching element, but any switching element shorted or opened according to a predetermined control current may be employed, which is apparent to those skilled in the art.

Figure 12:
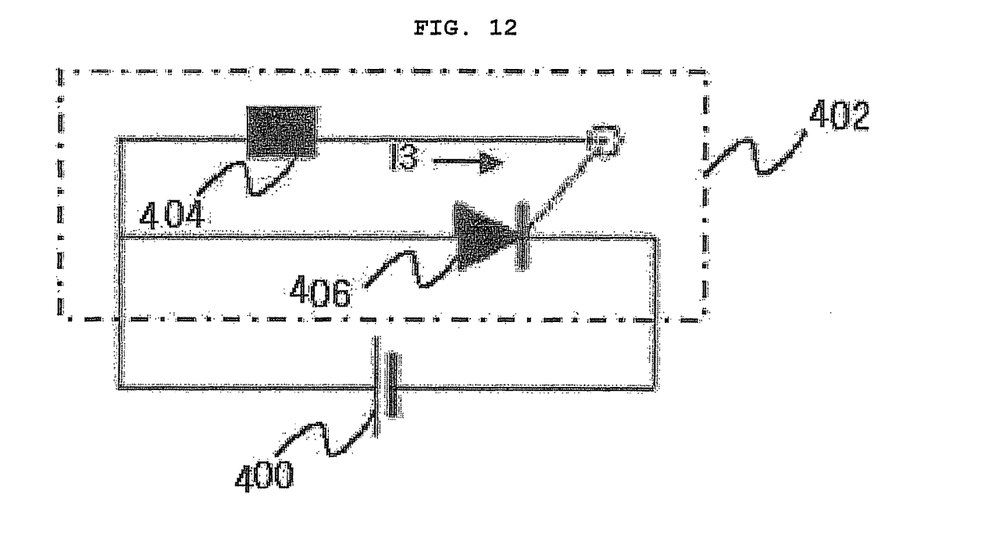
FIGS. 12 and 13 illustrate a current flow of the secondary battery protection apparatus of FIG. 11.
Figure 13:
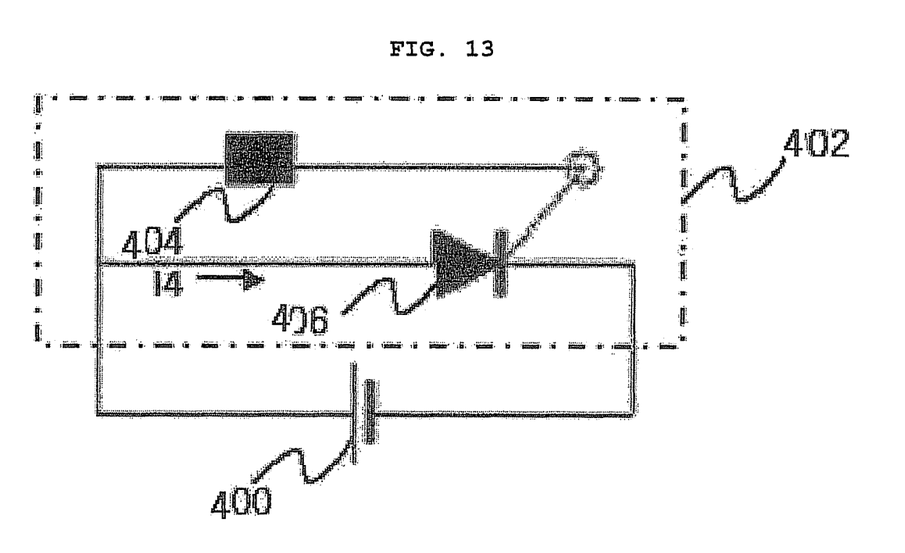

Now, an operation of the secondary battery protection apparatus 402 according to a forth exemplary embodiment of the present invention will be described with reference to FIGS. 12 and 13.

A state in which the lithium-ion secondary battery 400 is subjected to generation of heat or exposure to a high-temperature environment due to a change in external environment, internal short, external impacts, and so on is sensed by the MIT thermistor 404. In other words, when the lithium-ion secondary battery 400 generates heat at a predetermined temperature and thereby a resistance value of the MIT thermistor 404 is lowered to a predetermined resistance value, the MIT thermistor 404 supplies gate current I3 from the lithium-ion secondary battery 400 to a gate terminal of the second thyristor 406. The second thyristor 406 is conducted according to the gate current I3 flowing in through the MIT thermistor 404.

When the second thyristor 406 is conducted, both terminals of the lithium-ion secondary battery 400 are shorted, and thus current I4 of the lithium-ion secondary battery 400 flows through the second thyristor 406. As a result, the lithium-ion secondary battery 400 is forcibly discharged.

As described above, the fourth exemplary embodiment of the present invention can restrict inflammation or detonation of the lithium-ion secondary battery 400, which is subjected to the generation of heat or the exposure to a high-temperature environment due to internal short, external impacts, and so on, by means of the secondary battery protection apparatus 402 that is simply composed of the MIT thermistor 404 and the second thyristor 406.

INDUSTRIAL APPLICABILITY

As can be seen from the foregoing, according to the present invention, when a lithium-ion secondary battery is subjected to generation of heat or exposure to a high-temperature environment, it is discharged. Thereby, the lithium-ion secondary battery can be protected from inflammation or detonation together with a user.

Moreover, the present invention the lithium-ion secondary battery is not adapted to restrict supply of charging current to stop the generation of heat, but it is discharged when it is subjected to the generation of heat or the exposure to a high-temperature environment. Thereby, even when the lithium-ion secondary battery of a charged state is subjected to the generation of heat or the exposure to a high-temperature environment, its detonation or inflammation can be restricted.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

The invention claimed is:

1. An apparatus for protecting a secondary battery, the apparatus consisting of:
   a temperature sensor for detecting a temperature of the secondary battery and generating a control current when the detected temperature is higher than a predetermined temperature; and
   a switching element for shorting an anode and a cathode of the secondary battery and forcibly discharging the secondary battery when the control current is supplied,
   wherein the switching element consists essentially of a thyristor having a gate, an anode and a cathode, the anode and the cathode of the thyristor for connecting to the anode and the cathode of the secondary battery respectively,
   wherein the temperature sensor consists essentially of a metal insulator transition (MIT) thermistor, one end of which for connecting directly to the cathode of the secondary battery, and another end of which is connected directly to the gate of the thyristor,
   wherein the MIT thermistor supplies a control current from the secondary battery to the gate of the thyristor when heat generated by the secondary battery at a predetermined temperature lowers a resistance value of the MIT thermistor to a predetermined resistance value
   wherein the thyristor shorts the anode and the cathode of the secondary battery when the control current is supplied to the gate of the thyristor.

2. The apparatus according to claim 1, wherein the thyristor includes any one of a silicon controlled rectifier (SCR), an N-type thyristor, a dual gate thyristor, a bidirectional thyristor (TRIAC), and a gate turn off (GTO) thyristor.

3. A secondary battery including the apparatus according to claim 1.

4. The secondary battery according to claim 3, wherein the thyristor includes any one of a silicon controlled rectifier (SCR), an N-type thyristor, a dual gate thyristor, a bidirectional thyristor (TRIAC), and a gate turn off (GTO) thyristor.

5. An apparatus for protecting a secondary battery, the apparatus consisting of:
   a temperature sensor for detecting a temperature of the secondary battery and generating a control current when the detected temperature is higher than a predetermined temperature; and
   a switching element for shorting an anode of a cathode of the secondary battery and forcibly discharging the secondary battery when the control current is supplied,
   wherein the switching element consisting essentially of a thyristor having a gate, an anode and a cathode, the anode and cathode of the thyristor for connecting to the anode and the cathode of the secondary battery,
   wherein the temperature sensor consisting essentially of a metal insulator transition (MIT) thermistor, one end of which is for connecting directly to the cathode of the secondary battery, and another end of which is connected directly to the gate of the thyristor, wherein a resistance value of the MIT thermistor decreases at least one order of magnitude between a temperature ranging from 60 to 70° C., wherein the MIT thermistor supplies a control current from the secondary battery to the gate when heat generated by the secondary battery at a predetermined temperature lowers the resistance value of the MIT thermistor to a predetermined resistance value, and wherein the thyristor shorts the anode and the cathode of the secondary battery when the control current is supplied to the gate of the thyristor.

6. An apparatus for protecting a secondary battery, the apparatus consisting of:

a temperature sensor for detecting a temperature of the secondary battery and generating a control current when the detected temperature is higher than a predetermined temperature; and a switching element for shorting an anode and a cathode of the secondary battery and forcibly discharging the secondary battery when the control current is supplied, wherein the switching element consists essentially of a thyristor having a gate, an anode and a cathode, the anode and the cathode of the thyristor for connecting to the anode and the cathode of the secondary battery respectively, wherein the temperature sensor consists essentially of a thermistor, one end of which for connecting directly to the cathode of the secondary battery, and another end of which is connected directly to the gate of the thyristor, wherein the thermistor supplies a control current from the secondary battery to the gate of the thyristor when heat generated by the secondary battery at a predetermined temperature lowers a resistance value of the thermistor to a predetermined resistance value, and wherein the thyristor shorts the anode and the cathode of the secondary battery when the control current is supplied to the gate of the thyristor.

7. The apparatus according to claim 6, wherein the thermistor includes any one of a negative temperature coefficient (NTC) thermistor and a metal insulator transition (MIT) thermistor.

8. The apparatus according to claim 6, wherein the thyristor includes any one of a silicon controlled rectifier (SCR), anN-type thyristor, a dual gate thyristor, a bidirectional thyristor (TRIAC), and a gate turn off (GTO) thyristor.

* * * * *

UNITED STATES PATENT AND TRADEMARK OFFICE
CERTIFICATE OF CORRECTION

PATENT NO. : 8,673,469 B2
APPLICATION NO. : 11/490359
DATED : March 18, 2014
INVENTOR(S) : Sung Kyun Chang et al.

It is certified that error appears in the above-identified patent and that said Letters Patent is hereby corrected as shown below:

Claims

Column 10, line 20, Claim 8, "anN" should read --an N--.

Signed and Sealed this
Sixteenth Day of February, 2016

Michelle K. Lee
*Director of the United States Patent and Trademark Office*